US010213888B2

(12) United States Patent
Matsumoto et al.

(10) Patent No.: US 10,213,888 B2
(45) Date of Patent: Feb. 26, 2019

(54) CHIP SWEEPING ROBOT

(71) Applicant: MITSUBISHI HEAVY INDUSTRIES MACHINE TOOL CO., LTD., Ritto-shi, Shiga (JP)

(72) Inventors: Shigeru Matsumoto, Tokyo (JP); Junichi Okatani, Tokyo (JP)

(73) Assignee: MITSUBISHI HEAVY INDUSTRIES MACHINE TOOL CO., LTD., Shiga (JP)

(*) Notice: Subject to any disclaimer, the term of this patent is extended or adjusted under 35 U.S.C. 154(b) by 230 days.

(21) Appl. No.: 15/105,460

(22) PCT Filed: Dec. 19, 2014

(86) PCT No.: PCT/JP2014/083642
§ 371 (c)(1),
(2) Date: Jun. 16, 2016

(87) PCT Pub. No.: WO2015/102077
PCT Pub. Date: Jul. 9, 2015

(65) Prior Publication Data
US 2016/0311076 A1 Oct. 27, 2016

(30) Foreign Application Priority Data

Jan. 6, 2014 (JP) ................................ 2014-000068

(51) Int. Cl.
*B23Q 11/00* (2006.01)
*B08B 1/04* (2006.01)
(Continued)

(52) U.S. Cl.
CPC .......... *B23Q 11/0075* (2013.01); *A46B 13/00* (2013.01); *B08B 1/04* (2013.01);
(Continued)

(58) Field of Classification Search
CPC ....... B23Q 11/0075; A46B 13/00; B08B 1/04; B08B 13/00; B08B 1/00; Y02P 70/171
See application file for complete search history.

(56) References Cited

U.S. PATENT DOCUMENTS 5,280,666 A * 1/1994 Wood .................... A47L 7/0009
15/328
5,349,716 A * 9/1994 Millar ........................ A47L 1/06
15/236.06
(Continued)

FOREIGN PATENT DOCUMENTS

JP 61-20247 U 2/1986
JP 8-6636 A 1/1996
(Continued)

OTHER PUBLICATIONS

International Preliminary Report on Patentability and Written Opinion of the International Searching Authority (Forms PCT/IB/338, PCT/IB/373 and PCT/ISA/237) for International Application No. PCT/JP2014/083643, dated Jul. 21, 2016.
(Continued)

*Primary Examiner* — Robert J Scruggs
(74) *Attorney, Agent, or Firm* — Birch, Stewart, Kolasch & Birch, LLP

(57) ABSTRACT

There is provided a chip sweeping robot which is capable of possessing adaptability to various machine tools and automatically sweeping a wide range efficiently. To this end, a chip sweeping robot configured to sweep chips, which are scattered on an upper surface of a table of a machine tool at the time of machining a workpiece attached to the table, by traveling in accordance with a travel route set on the upper surface, includes: a robot body which autonomously travels on the upper surface; a rotating brush which sweeps the chips out forward in a traveling direction by being rotated from a lower side to an upper side forward in the traveling
(Continued)

direction; and a blade which scoops out the chips, which pass through the rotating brush, forward in the traveling direction and sends the chips to a rotating region of the rotating brush.

22 Claims, 8 Drawing Sheets

(51) Int. Cl.
    *B08B 13/00*     (2006.01)
    *A46B 13/00*     (2006.01)
    *B08B 1/00*     (2006.01)

(52) U.S. Cl.
    CPC ............... *B08B 13/00* (2013.01); *B08B 1/00* (2013.01); *Y02P 70/171* (2015.11)

(56) References Cited

U.S. PATENT DOCUMENTS

| | | | |
|---|---|---|---|
| 7,155,307 B2* | 12/2006 | Seemann | B62D 55/00 700/245 |
| 7,320,149 B1* | 1/2008 | Huffman | A47L 11/24 15/319 |
| 2008/0005861 A1* | 1/2008 | Niizaki | A46D 1/00 15/207.2 |
| 2008/0276407 A1* | 11/2008 | Schnittman | A47L 11/34 15/319 |
| 2012/0006352 A1* | 1/2012 | Holappa | B08B 1/008 134/6 |
| 2014/0130295 A1* | 5/2014 | Robinson | A47L 11/4044 15/401 |
| 2015/0297047 A1* | 10/2015 | Van Der Kooi | A47L 7/0009 15/364 |

FOREIGN PATENT DOCUMENTS

| | | |
|---|---|---|
| JP | 10-180585 A | 7/1998 |
| JP | 11-42530 A | 2/1999 |
| JP | 2004-118554 A | 4/2004 |
| JP | 2006-187477 A | 7/2006 |
| JP | 2007-163223 A | 6/2007 |
| WO | WO 2014/208192 A1 | 12/2014 |

OTHER PUBLICATIONS

International Search Report and Written Opinion of the International Searching Authority (Forms PCT/ISA/210, PCT/ISA/220 and PCT/ISA/237) for International Application No. PCT/JP2014/083643, dated Mar. 24, 2015, with an English translation of the International Search Report only.

\* cited by examiner

CHIP SWEEPING ROBOT

TECHNICAL FIELD

The present invention relates to a chip sweeping robot, which is capable of automatically sweeping chips that are scattered in a machining process.

BACKGROUND ART

In the field of machining, NC machine tools have been widely adopted for the purpose of automation and manpower saving. Such a machine tool performs a continuous operation for a long time while automatically changing tools and workpieces. In consequence, a large amount of chips are scattered and deposited therein. Then, if the scattered chips remain deposited on a machine sliding portion or on a workpiece, the chips may adversely affect a sliding action of the machine or cause damage to the workpiece or any of the tools.

A method of sweeping scattered chips by workers on their own has generally been adopted as a conventional chip sweeping method. However, if the workers sweep the chips by themselves in this way, it takes time and trouble for sweeping and what is more, sweeping outcomes may be uneven among the workers.

Given this situation, among the machine tools there have recently been provided those including a chip sweeping device for solving the above-mentioned problem, and an example of such a conventional chip sweeping device has been disclosed in Patent Document 1.

PRIOR ART DOCUMENT

Patent Document

Patent Document 1: Japanese Patent Application Publication No. Hei 11-42530

SUMMARY OF THE INVENTION

Problem to be Solved by the Invention

According to the conventional chip sweeping device described above, a conveyor chain is travelably supported at a lower part of a table that can attach a workpiece, and multiple scraping plates are provided on an outer surface of the conveyor chain. Hence, when the table moves on a bed at the time of machining by the machine tool, the scraping plates are rotated along with the travel of the conveyor chain, and chips on the bed are scraped and swept off by the rotation of the scraping plates.

However, since the conveyor chain is installed below the table in the above-described conventional chip sweeping device, a moving range of the conveyor chain is restricted by a moving range of the table. As mentioned above, the adoption of the chip sweeping device designed to be directly attached to the machine tool leads to a restriction on its sweeping range. Thus, the chip sweeping device lacks not only a capability of sufficiently and efficiently sweeping chips, but also adaptability to various machine tools.

Given the circumstances, the present invention has been made to solve the aforementioned problem and an object thereof is to provide a chip sweeping robot, which is capable of possessing adaptability to various machine tools and automatically sweeping a wide range efficiently.

Means for Solving the Problem

A chip sweeping robot according to a first aspect of the invention is configured to sweep chips, which are scattered on an upper surface of a table of a machine tool at the time of machining an object to be machined being attached onto the upper surface of the table, by traveling in accordance with a travel route set on the upper surface of the table, and is characterized in that the chip sweeping robot comprises: a robot body configured to autonomously travel on the upper surface of the table; a rotating brush provided in front of the robot body and configured to sweep the chips out forward in a traveling direction by being rotated from a lower side to an upper side forward in the traveling direction; and a blade provided behind the rotating brush and configured to scoop out the chips, which pass through the rotating brush, forward in the traveling direction and to send the chips to a rotating region of the rotating brush.

The chip sweeping robot according to a second aspect of the invention is characterized in that the chip sweeping robot comprises a brush rotating motor provided behind the blade and configured to rotate the rotating brush, and the rotating brush is connected to the brush rotating motor on outside in a width direction of the blade in such a way as to bypass the blade.

The chip sweeping robot according to a third aspect of the invention is characterized in that the chip sweeping robot comprises a magnet provided on a lower surface of the robot body and configured to exert an attracting force onto the upper surface of the table and to inhibit the robot body from being lifted off.

The chip sweeping robot according to a fourth aspect of the invention is characterized in that the magnet is provided at a rear part of the robot body.

The chip sweeping robot according to a fifth aspect of the invention is characterized in that the chip sweeping robot comprises a battery serving as a drive source for travel of the robot body, and the battery is provided at the rear part of the robot body.

The chip sweeping robot according to a sixth aspect of the invention is characterized in that the chip sweeping robot comprises a protection cover covering the robot body, the rotating brush and the blade from above and both right and left sides.

The chip sweeping robot according to a seventh aspect of the invention is characterized in that the protection cover comprises an upper cover unit forming an upper part of the protection cover, and an upper surface of the upper cover unit is an inclined surface.

The chip sweeping robot according to an eighth aspect of the invention is characterized in that the upper cover unit is formed into a convex shape in such a way as to be inclined downward from a central part in a width direction toward two end portions in the width direction.

The chip sweeping robot according to a ninth aspect of the invention is characterized in that the chip sweeping robot comprises crawlers rotatably supported on both right and left side portions of the robot body, and the protection cover covering the robot body is supported on side surfaces of the crawlers.

The chip sweeping robot according to a tenth aspect of the invention is characterized in that the chip sweeping robot comprises: an anti-drop sensor configured to detect the upper surface of the table; and an anti-drop control unit configured to control the travel of the robot body depending on a detection result of the anti-drop sensor and to prevent the robot body from dropping off the upper surface of the table of the robot body.

The chip sweeping robot according to an eleventh aspect of the invention is characterized in that the anti-drop sensor is provided in front of the robot body.

The chip sweeping robot according to a twelfth aspect of the invention is characterized in that the anti-drop sensor is provided behind the blade.

The chip sweeping robot according to a thirteenth aspect of the invention is characterized in that the chip sweeping robot comprises: an obstacle detection sensor configured to detect an obstacle located in front of the robot body; and a collision avoidance control unit configured to control travel of the robot body depending on a detection result of the obstacle detection sensor and to avoid a collision of the robot body into the obstacle.

The chip sweeping robot according to a fourteenth aspect of the invention is characterized in that the chip sweeping robot comprises a partition plate isolating the obstacle detection sensor from the rotating brush and the blade.

The chip sweeping robot according to a fifteenth aspect of the invention is characterized in that the obstacle detection sensor is provided behind a front end portion of a protection cover covering the rotation brush.

The chip sweeping robot according to a sixteenth aspect of the invention is characterized in that the obstacle detection sensor is provided in front of the rotating brush.

The chip sweeping robot according to a seventeenth aspect of the invention is characterized in that the travel route of the robot body is set in accordance with a size of the upper surface of the table and with an attachment position and a size of the object to be machined.

The chip sweeping robot according to an eighteenth aspect of the invention is characterized in that the robot body travels on the travel route when the machine tool is operated, and the robot body stops on the travel route when the operation of the machine tool is stopped.

The chip sweeping robot according to a nineteenth aspect of the invention is characterized in that lengths of bristles of the rotating brush, hardness of the bristles, and a density of the bristles are set in accordance with a shape of a T groove formed in the upper surface of the table.

The chip sweeping robot according to a twentieth aspect of the invention is characterized in that the blade is curved forward in the traveling direction from an upper end portion to a lower end portion of the blade.

The chip sweeping robot according to a twenty-first aspect of the invention is characterized in that a material of the rotating brush is a heat-resistant resin.

The chip sweeping robot according to a twenty-second aspect of the invention is characterized in that a material of the blade is a heat-resistant resin.

Effect of the Invention

As described above, according to the chip sweeping robot of the present invention, the rotating brush and the blade are provided in front of the robot body, which can autonomously travel on the upper surface of the table, sequentially from the front side to the back side in the traveling direction. Thus, the chip sweeping robot is capable of possessing adaptability to various machine tools and automatically sweeping a wide range efficiently.

MODE FOR CARRYING OUT THE INVENTION

Figure 1:
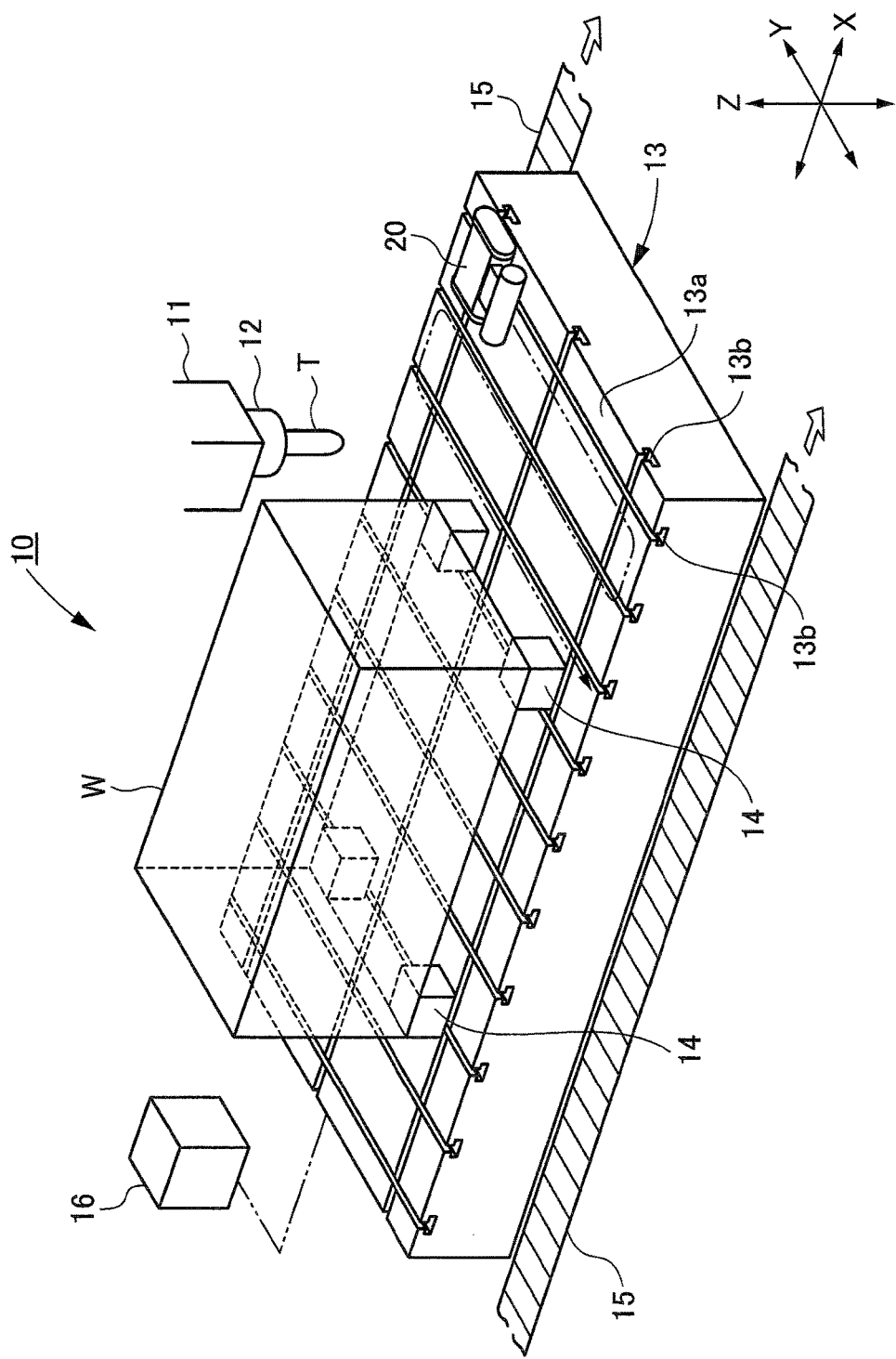
FIG. 1 is an enlarged view of a substantial part of a machine tool provided with a chip sweeping robot according to an embodiment of the present invention.
Figure 2:
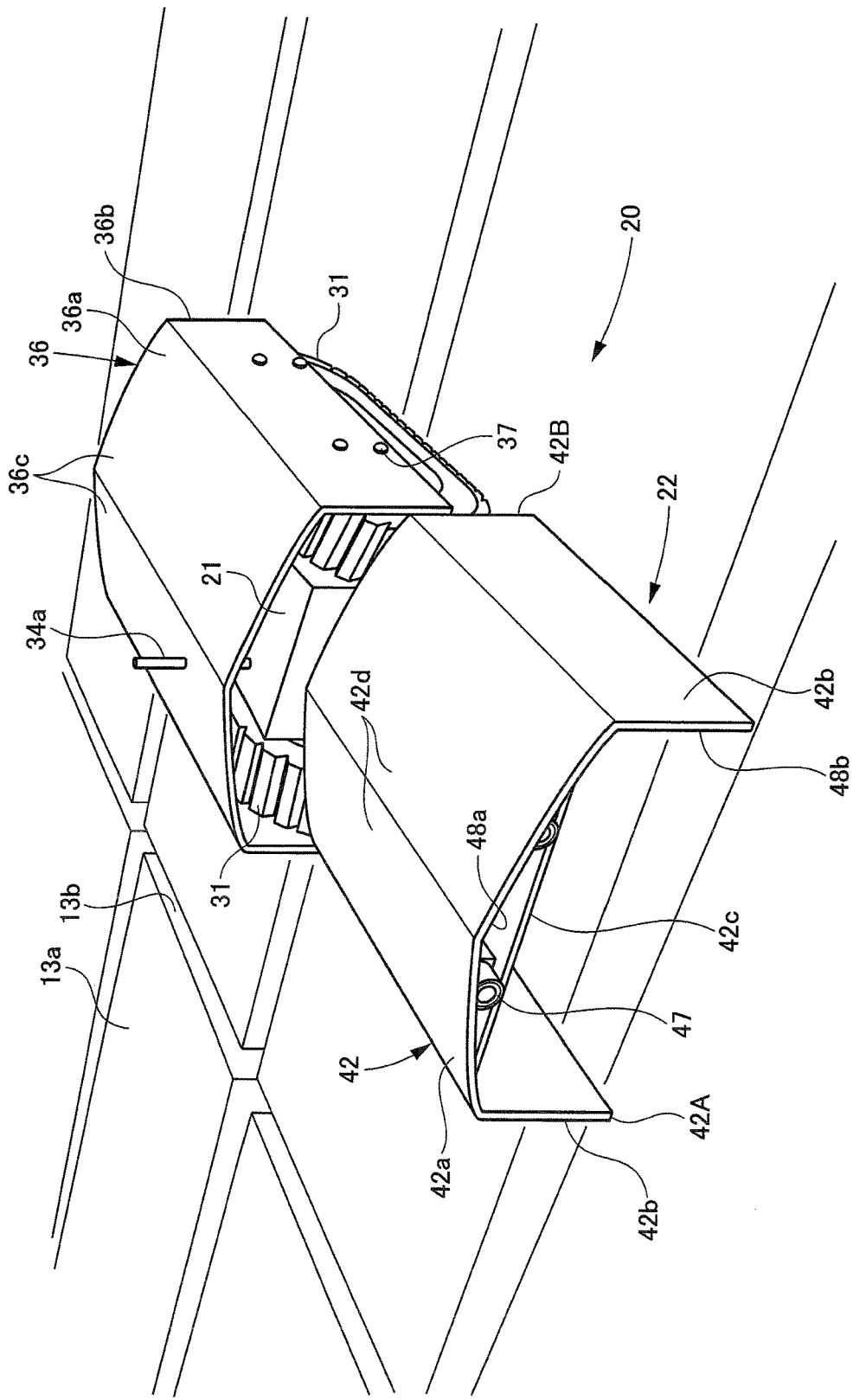
FIG. 2 is an external perspective view of the chip sweeping robot.
Figure 3:
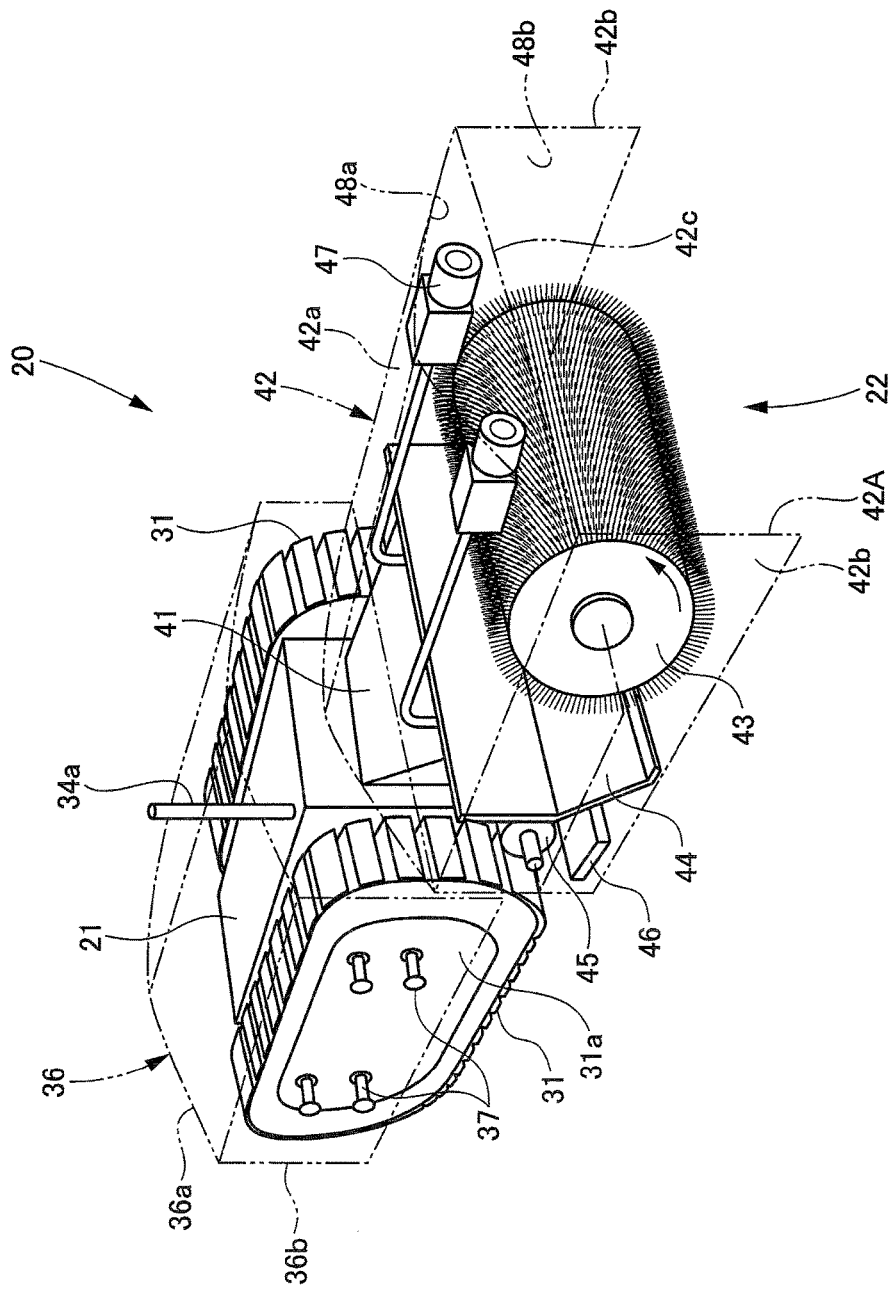
FIG. 3 is a front perspective view of the chip sweeping robot.
Figure 4:
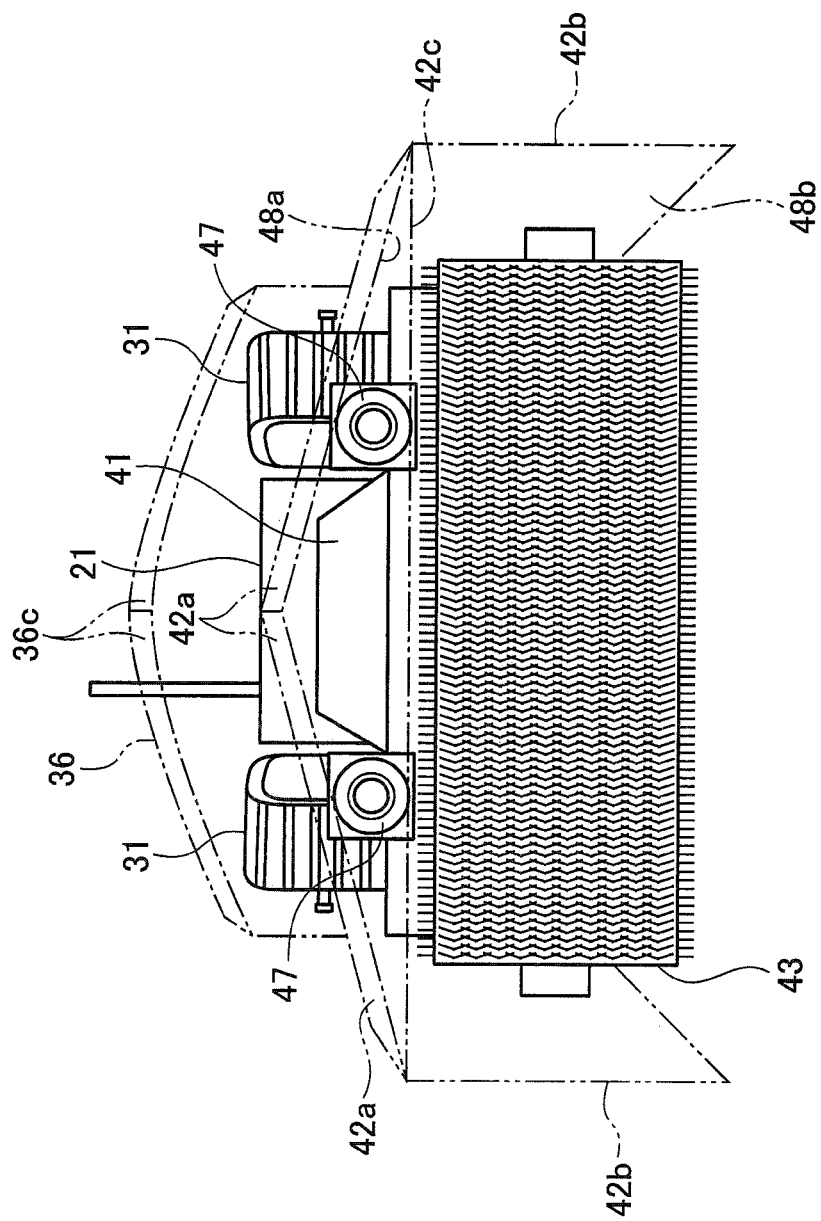
FIG. 4 is a front view of the chip sweeping robot.
Figure 5:
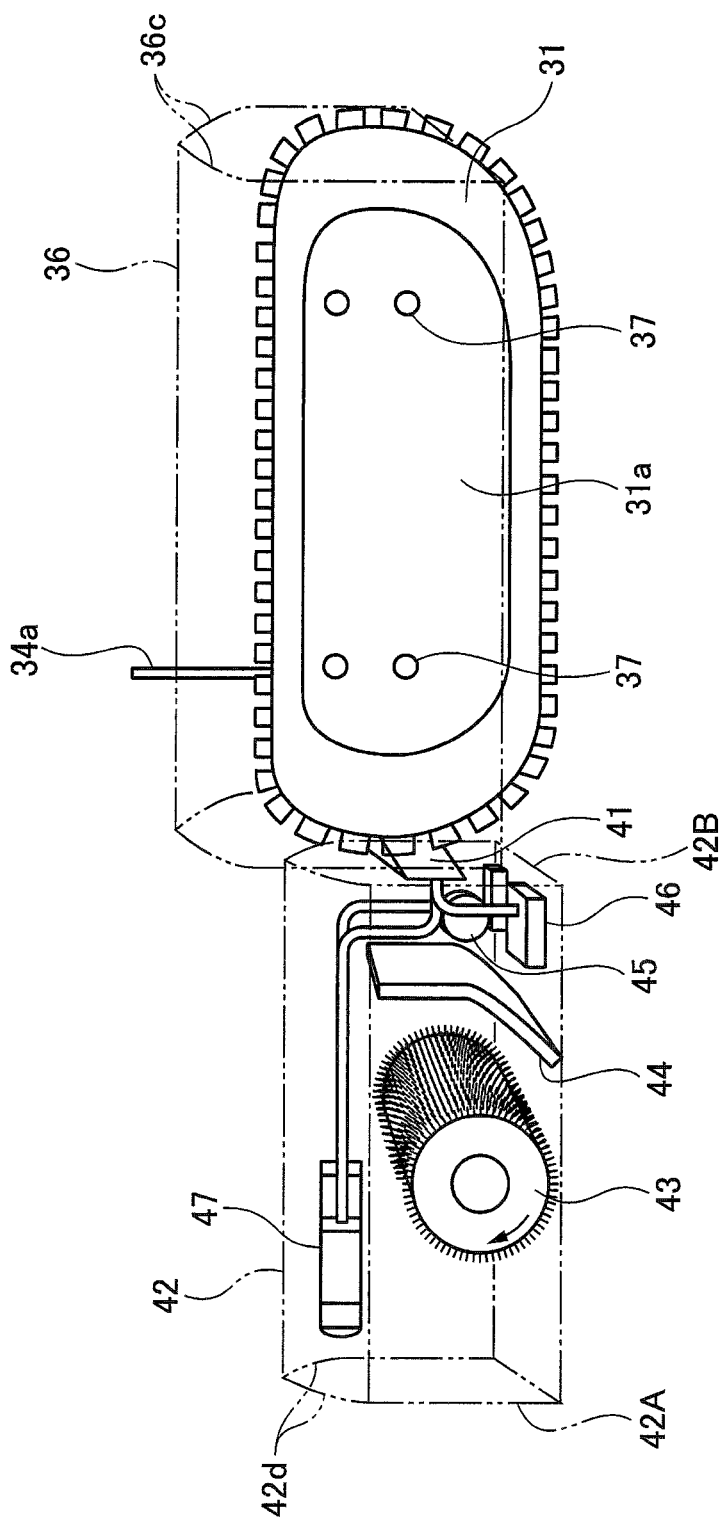
FIG. 5 is a side view of the chip sweeping robot.
Figure 6:
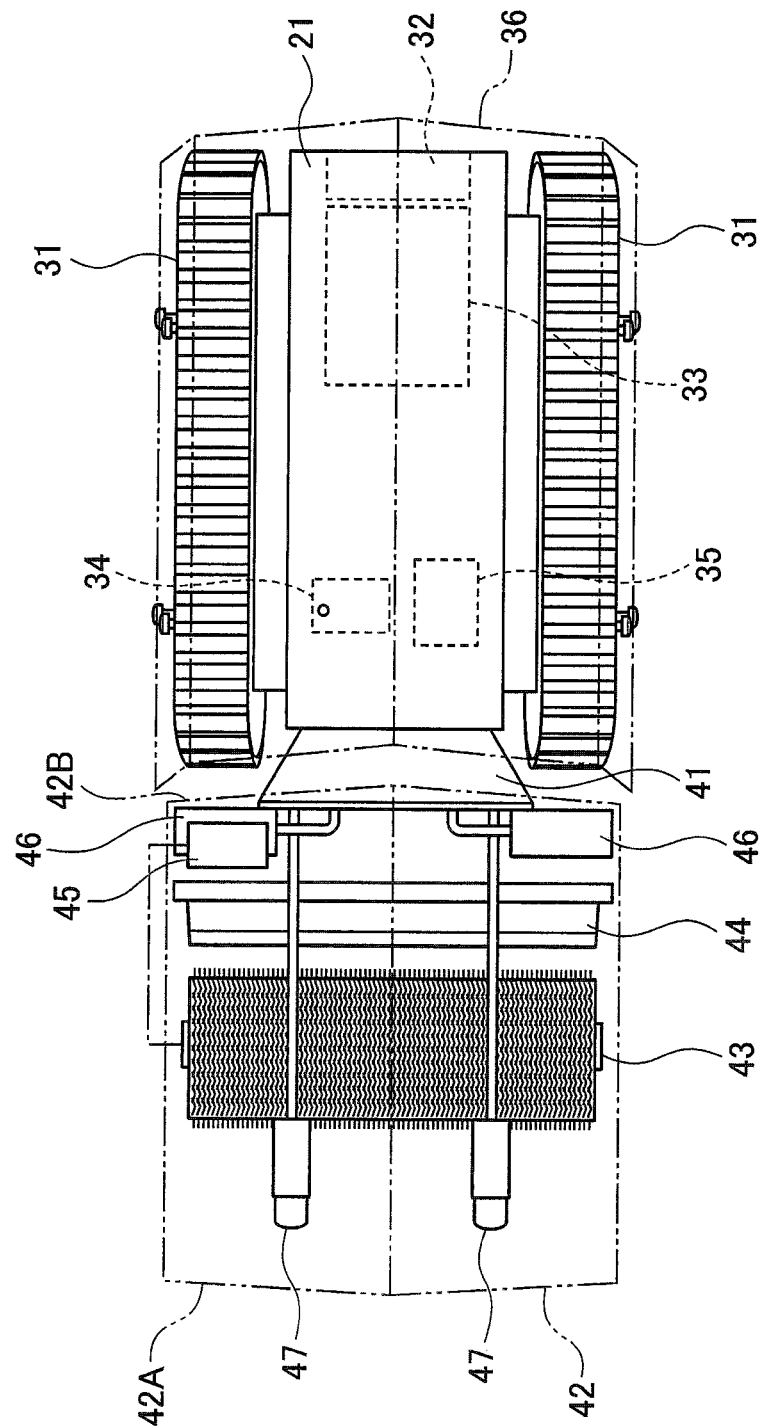
FIG. 6 is a top view of the chip sweeping robot.

A chip sweeping robot according to the present invention will be described below in detail by using the drawings.
Embodiment As shown in FIG. 1, a ram 11 and a table 13 are supported by a machine tool 10 in such a way as to be relatively movable in three orthogonal directions. For example, the ram 11 is movably supported in a Y-axis direction equivalent to a width direction of the machine and in a Z-axis direction equivalent to a vertical direction of the machine, while the table 13 is movably supported in an X-axis direction equivalent to a front-back direction of the machine.

In the ram 11, a main spindle 12 is rotatably supported about the Z axis. A tool T is detachably attached to a tip end of the main spindle 12. Meanwhile, a workpiece (an object to be machined) W is put on an upper surface 13a of the table 13 by use of jigs 14. Here, multiple T grooves 13b are formed in the upper surface 13a of the table 13 in such a way as to extend in the X-axis and Y-axis directions. The jigs 14 can be fixed to the T grooves 13b by using fixtures (not shown).

In the meantime, chip conveyors 15 are provided at both right and left side portions of the table 13 in such a way as to be capable of traveling in the X-axis direction. The chip conveyors 15 are configured to discharge chips, which are swept off the upper surface 13a of the table 13 by a chip sweeping robot 20 to be described later, to the outside of the machine tool 10 for recovery.

Accordingly, the workpiece W can be machined with the tool T while moving the ram 11 in the Y-axis and Z-axis directions and moving the table 13 in the X-axis direction. Meanwhile, when the workpiece W is machined with the tool T as described above, a large amount of chips are generated. The chips are scattered over a wide range on the upper surface 13a of the table 13 and are deposited thereon.

Given the circumstance, the machine tool 10 adopts the autonomous traveling crawler-equipped chip sweeping robot 20 in order to sweep the chips scattered on the upper surface (a robot sweeping surface) 13a of the table 13.

The chip sweeping robot 20 has a function to push the chips forward in its traveling direction and a function to pick the chips out of the T grooves 13b. The chip sweeping robot 20 is configured to travel in accordance with a preset travel route on the upper surface 13a of the table 13, thereby discharging the chips, which are scattered and deposited on the upper surface 13a and inside the T grooves 13b, onto the chip conveyors 15. At this time, the travel of the chip sweeping robot 20 is coordinated with an operation of the machine tool 10.

Specifically, the machine tool 10 is provided with a control device 16. The control device 16 is configured to perform integrative control of machining actions (such as movements in the X-axis, Y-axis, and Z-axis directions and the rotating speed of the main spindle 12) of the machine tool 10, and traveling actions of the chip sweeping robot 20.

Moreover, the shape and size (area) of the upper surface 13a, installation positions of the T grooves 13b, attachment positions and the size of the jigs 14, an attachment position and the size of the workpiece W, and the like are inputted in advance to the control device 16 by using an input device (not shown). Furthermore, the control device 16 is made capable of not only setting (simulating) a travel route of the chip sweeping robot 20 based on the pieces of information inputted by an operator, but also displaying the preset travel route on a display device (not shown).

In addition, the operator having confirmed the display travel route can not only cause the chip sweeping robot 20 to travel in accordance with the travel route preset by the control device 16 as it is, but also change the preset travel route and cause the chip sweeping robot 20 to travel in accordance with the changed travel route. For example, the operator uses the input device and changes the preset travel route depending on scattered directions of the chips, and positions of deposition and an amount of deposition of the chips, which are estimated on the basis of the material of the workpiece W, machining conditions, and the like.

Next, a configuration of the chip sweeping robot 20 will be described in detail by using FIG. 2 to FIG. 7.

As shown in FIG. 2 to FIG. 7, the chip sweeping robot 20 includes a robot body 21, and a chip sweeping device 22 provided at a front side in the traveling direction of the robot body 21.

Crawlers 31 are rotatably supported on both right and left side portions of the robot body 21. By adopting the crawlers 31 as travel wheels of the robot body 21 as mentioned above, the contact area of the crawlers 31 with the upper surface 13a can be increased. Thus, it is possible to increase friction resistance of the crawlers 31.

Accordingly, although the material of the table 13 is generally a cast product and its upper surface 13a is very slippery, it is possible to achieve stable travel while preventing the robot body 21 from skidding by enabling the robot body 21 to travel on the crawlers 31.

Figure 7:
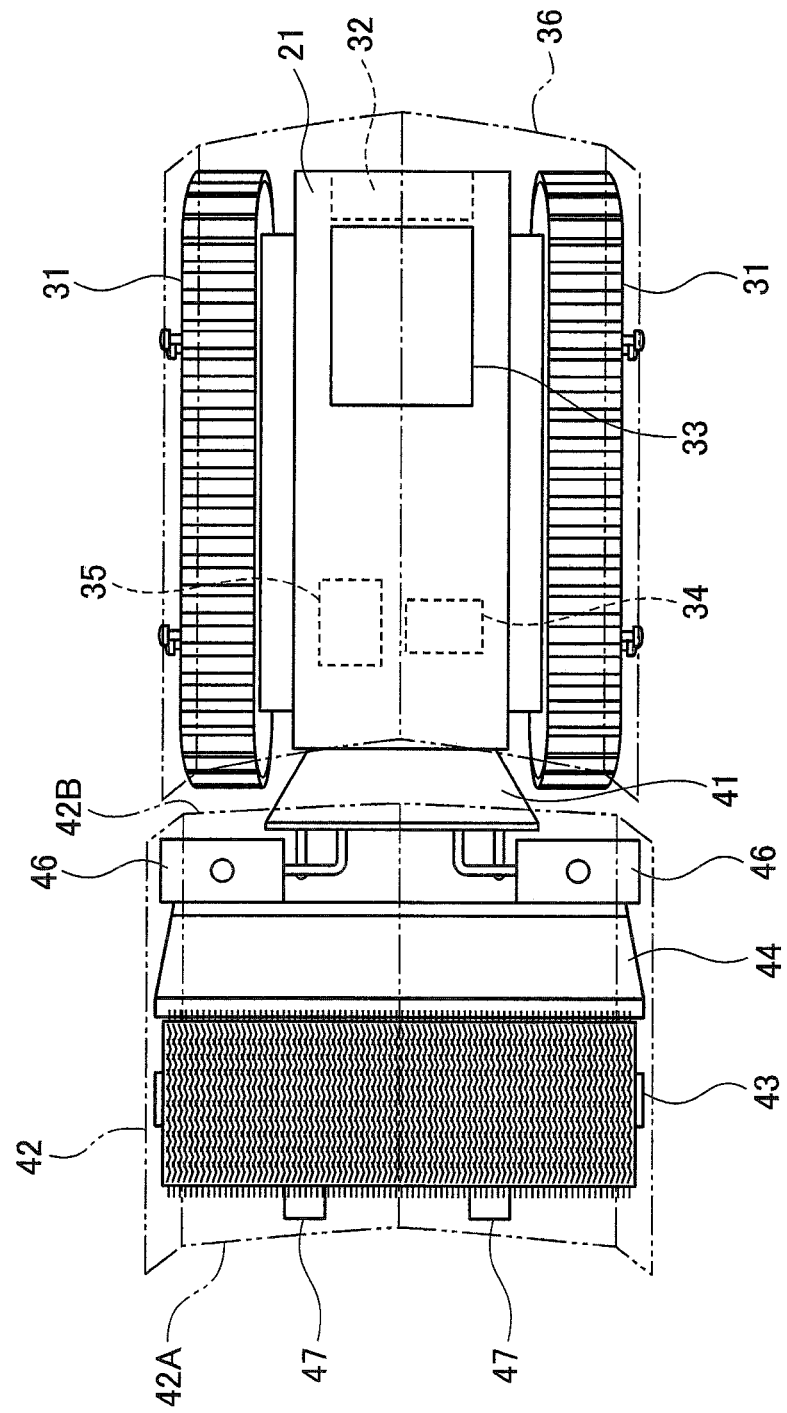
FIG. 7 is a bottom view of the chip sweeping robot.

In the meantime, as shown in FIG. 7, a rechargeable battery 32 is built in a rear part of the robot body 21. The battery 32 is configured to supply a drive current to the crawlers 31, and is made easily replaceable through a battery insertion slot opened to a rear surface of the robot body 21. By applying the rechargeable battery 32 to a drive source for the travel of the robot body 21 as described above, the robot body 21 can not only travel autonomously but also be carried easily by the operator.

Furthermore, as shown in FIG. 7, a magnet 33 is provided on a lower surface of the robot body 21. The magnet 33 is configured to exert an attracting force (a magnetic force) onto the upper surface 13a of the table 13. Here, a reactive force to a pushing force of the chip sweeping robot 20, which is applied in the course of pushing the chips forward in the traveling direction, may act on the robot body 21 and the rear part of the robot body 21 may be lifted off. In this case, the attracting force of the magnet 33 can inhibit the rear part from being lifted off. Here, the attracting force of the magnet 33 is set to such a magnitude that does not hinder the rotation (travel) of the crawlers 31.

Here, the weight of the battery 32 and the weight of the magnet 33 can also inhibit the rear part of the robot body 21 from being lifted off. Accordingly, when the battery 32 and the magnet 33 are mounted on the robot body 21, it is possible to improve an anti-lift-off effect by providing these components as close to the rear part of the robot body 21 as possible.

In the meantime, a transceiver 34 is built in a front part of the robot body 21 as shown in FIG. 2 to FIG. 7. The transceiver is configured to be able to perform transmission and reception of radio signals via an antenna 34a to and from another transceiver (not shown) connected to the control device 16 of the machine tool 10. The transceiver 34 is connected to a robot control unit (an anti-drop control unit, a collision avoidance control unit) 35.

Thus, it is possible to coordinate the travel of the chip sweeping robot 20 with the operation of the machine tool 10. In other words, the chip sweeping robot 20 is configured to travel on the travel route when the machine tool 10 is operated (when machining is performed), and on the other hand, to stop on the travel route when the operation of the machine tool 10 is stopped (when the machining is stopped).

Moreover, as shown in FIG. 2 to FIG. 7, the robot body 21 is provided with a metallic body protection cover 36. The body protection cover 36 is laid out so as to cover the robot body 21 and the pair of right and left crawlers 31 from above and from both the right and left sides. Thus, the body protection cover 36 is configured to protect the robot body 21 and the crawlers 31 against the chips falling in a high-temperature state. The body protection cover 36 is formed from an upper cover unit 36a, and a pair of right and left side cover units 36b.

The upper cover unit 36a is designed to cover the robot body 21 and the crawlers 31 from above. A cross section of the upper cover unit 36a is formed into a convex shape in such a way as to be inclined downward from a central part in a width direction toward two end portions in the width direction. By forming upper surfaces 36c of the upper cover unit 36a into the inclined surfaces as described above, it is possible to prevent deposition of the chips on the upper surfaces 36c. Meanwhile, the side cover units 36b is designed to extend downward from right and left end portions of the upper cover unit 36a, thereby covering side surfaces 31a of the crawlers 31 from the outside thereof. Inner surfaces of the side cover units 36b are supported by the side surfaces 31a of the crawlers 31 by means of multiple support pins 37.

On the other hand, as shown in FIG. 2 to FIG. 7, the chip sweeping device 22 is joined to a front face of the robot body 21 by means of a joint member 41. The chip sweeping device 22 has a configuration in which a rotating brush 43, a blade 44, a brush rotating motor 45, anti-drop sensors 46, and obstacle detection sensors 47 are covered with a metallic device protection cover 42. In other words, the device protection cover 42 serves as a metallic hood member for protecting the rotating brush 43, the blade 44, the brush rotating motor 45, the anti-drop sensors 46, and the obstacle detection sensors 47 against the chips falling in the high-temperature state.

The device protection cover 42 is formed from an upper cover unit 42a, a pair of right and left side cover units 42b, and a partition plate 42c. A cross section of the upper cover unit 42a is formed into a convex shape in such a way as to be inclined downward from a central part in a width direction toward two end portions in the width direction. By forming upper surfaces 42d of the upper cover unit 42a into the inclined surfaces as described above, it is possible to prevent deposition of the chips on the upper surfaces 42d. Meanwhile, the side cover units 42b extend downward from right and left end portions of the upper cover unit 42a.

Moreover, right and left end portions of the partition plate 42c are connected to junctions of both the right and left end portions of the upper cover unit 42a and upper end portions of the side cover units 42a. In other words, the partition plate 42c plays a role in partitioning a space surrounded by the upper cover unit 42a and the side cover units 42b into an upper storage space 48a surrounded in conjunction with the upper cover unit 42a, and a lower storage space 48b surrounded in conjunction with the side cover units 42b.

Here, the two obstacle detection sensors 47 are stored in the upper storage space 48a. The obstacle detection sensors 47 are configured to detect an obstacle (any of the jigs 14 or the workpiece W) located in front of the chip sweeping robot 20. Moreover, when any of the obstacle detection sensors 47 detects the obstacle, the obstacle detection sensor 47 outputs a detection result to the robot control unit (the collision avoidance control unit) 35, and the robot control unit 35 controls the travel and the traveling directions of the crawlers 31 depending on the detection result. Thus, the chip sweeping robot 20 avoids a collision with the obstacle and then returns to the travel route.

Here, regarding the positions to attach the obstacle detection sensors 47, if the obstacle detection sensors 47 are attached in such a way as to project forward from a front end portion 42A of the device protection cover 42, the obstacle detection sensors 47 are at risk of coming into contact with the chips kept at a high temperature. On the other hand, if the obstacle detection sensors 47 are attached close to a rear end portion 42B of the device protection cover 42, a detection range of each obstacle detection sensor 47 is narrowed by being surrounded by the device protection cover 42. As a consequence, the obstacle may collision into the front end portion 42A of the device protection cover 42, or may intrude into the device protection cover 42 and come into contact with the rotating brush 43.

In view of the above, when the obstacle detection sensors 47 are attached to the inside of the storage space 48a of the device protection cover 42, the obstacle detection sensors 47 are installed behind the front end portion 42A of the device protection cover 42 and in front of the rotating brush 43. In this way, it is possible to prevent failures of the obstacle detection sensors 47 caused by the chips and to prevent the device protection cover 42 and the rotating brush 43 from being damaged by the obstacle, while improving detection accuracy of the obstacle detection sensors 47.

In the meantime, the rotating brush 43, the blade 44, the brush rotating motor 45, and the anti-drop sensors 46 are stored in the lower storage space 48b.

The rotating brush 43 is rotatably supported between inner surfaces of the side cover units 42b. Its rotating direction is set to a direction to be rotated from a lower side to an upper side forward in the traveling direction. In other words, the rotating brush 43 can sweep out the chips forward in the traveling direction by means of its rotation. Accordingly, a heat-resistant resin which can withstand the heat of the chips is used as the material of the rotating brush 43. Here, lengths of bristles of the rotating brush 43, hardness of the bristles, and a density of the bristles are set in accordance with abrasion resistance and the shape (depth) of the T grooves.

Meanwhile, the blade 44 is provided behind the rotating brush 43 in the traveling direction. A front surface of the blade 44 has a curved surface in such a way as to be curved forward in the traveling direction from its upper end portion to a lower end portion in order to scoop the chips easily. Moreover, the upper end portion of the blade 44 is supported by a lower surface of the partition plate 42c, while both right and left end portions of the blade 44 are supported by the respective inner surfaces of the side cover units 42b. In other words, the blade 44 is supported by the side cover units 42b and the partition plate 42c without providing any gaps.

Moreover, a heat-resistant resin which can withstand the heat of the chips is used as the material of the blade 44. Thus, by adopting the above-described scooping plate structure, the blade 44 can scoop out the chips, which pass through the rotating brush 43, forward in the traveling direction and bring the chips back to a rotating region of the rotating brush 43.

Furthermore, the brush rotating motor 45 and the anti-drop sensors 46 are provided behind the blade 44 in the traveling direction.

The brush rotating motor 45 is disposed in a transversely mounted state at one end side (which is the right side in this embodiment) in a width direction inside the storage space 48b. At this time, an output shaft of the brush rotating motor 45 and a pulley provided on a right end portion of the rotating brush 43 are connected to each other inside a motor box that is provided outside the storage space 48b (the side cover unit 42b on the right side) by use of a drive belt. In other words, the rotating brush 43 is connected to the brush rotating motor 45 on the outside in the width direction of the blade 44 in such a way as to bypass the blade 44.

In addition, the pair of right and left anti-drop sensors 46 are provided below the brush rotating motor 45. The anti-drop sensors 46 are configured to constantly detect the upper surface 13a of the table 13. Then, if any of the anti-drop sensors 46 becomes unable to detect the upper surface 13a, the anti-drop sensor 46 outputs a detection result to the robot control unit (the anti-drop control unit) 35, and the robot control unit 35 controls the travel and the traveling directions of the crawlers 31 depending on the detection result. Thus, the chip sweeping robot 20 avoids dropping off the upper surface 13a of the table 13 and then returns to the travel route.

Meanwhile, by isolating the obstacle detection sensors 47 from the rotating brush 43 and the blade 44 by using the partition plate 42c, it is possible to protect the obstacle detection sensors 47 against the chips stirred up by sweeping actions of the rotating brush 43 and the blade 44. Likewise, by providing the brush rotating motor 45 and the anti-drop sensors 46 behind the blade 44 in the traveling direction, it is possible to protect the brush rotating motor 45 and the anti-drop sensors 46 against the chips stirred up by the sweeping actions of the rotating brush 43 and the blade 44.

Furthermore, by storing the rotating brush 43 and the blade 44 in the storage space 48b defined by the side covers units 42b and the partition plate 42c, it is possible to guide the chips, which escape from being swept out by the rotating brush 43, reliably to the blade 44 and to prevent the chips, which are stirred up by the sweeping actions of the rotating brush 43 and the blade 44, from being scattered around the chip sweeping robot 20.

Figure 8:
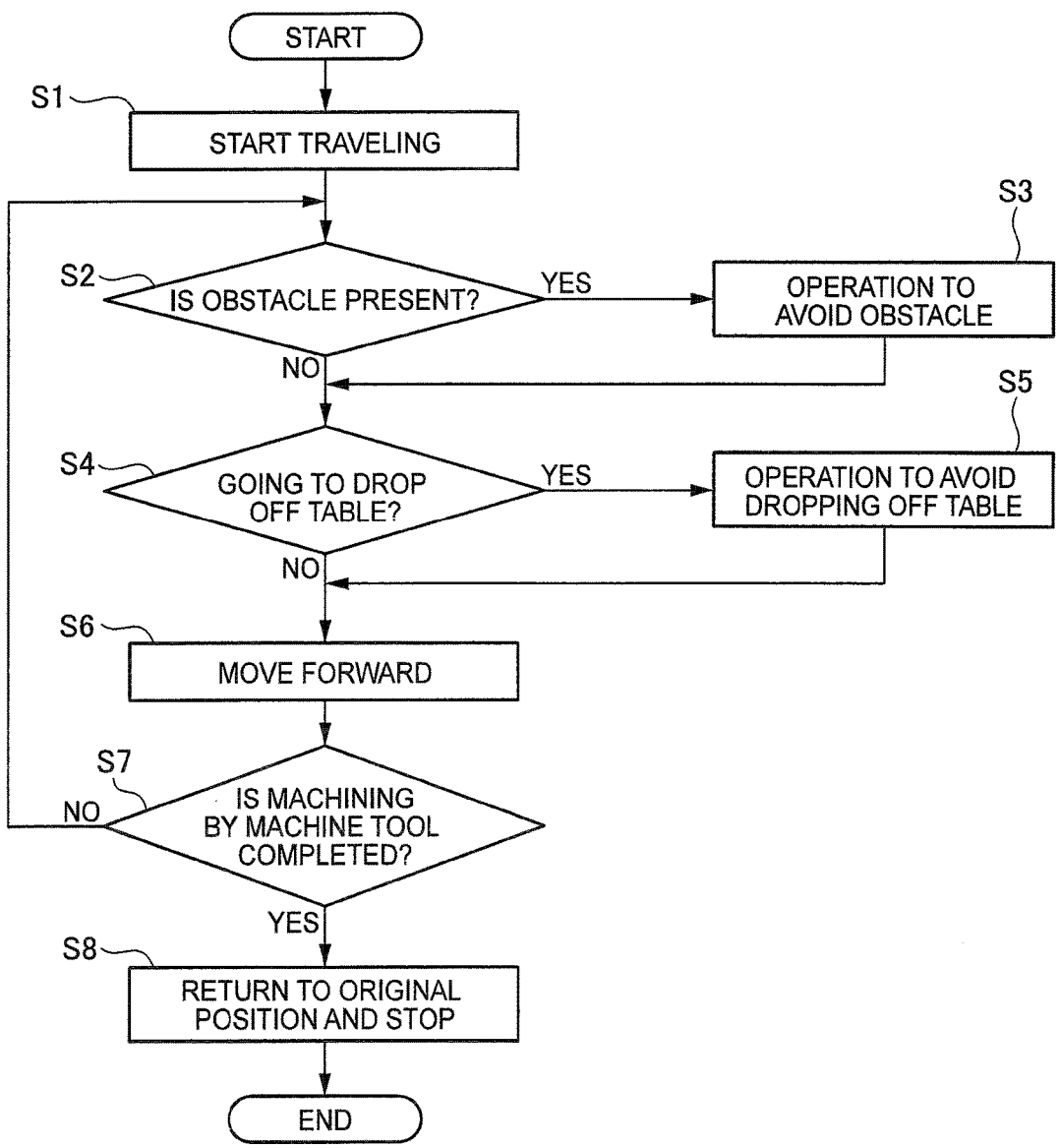
FIG. 8 is a control flowchart at the time of travel of the chip sweeping robot.

Next, travel control of the chip sweeping robot 20 will be described in detail by using FIG. 8.

First, in step S1, when the machine tool 10 is operated and the machining of the workpiece W is started, the chip sweeping robot 20 starts traveling in tandem with the operation of the machine tool 10.

Subsequently, in step S2, based on the detection result of any of the obstacle detection sensors 47, it is determined whether or not an obstacle is present at the front in the traveling direction of the chip sweeping robot 20. Here, the control proceeds to step S3 when the obstacle is determined to be present. On the other hand, the control proceeds to step S4 when the obstacle is determined to be not present.

Then, in step S3, the travel and the traveling directions of the crawlers 31 are controlled whereby the chip sweeping robot 20 avoids the obstacle.

Subsequently, in step S4, based on the detection result of any of the anti-drop sensors 46, it is determined whether or not the chip sweeping robot 20 is going to drop off the upper surface 13*a* of the table 13. Here, the control proceeds to step S5 when the chip sweeping robot 20 is determined to be going to drop off if the chip sweeping robot 20 keeps moving straight. On the other hand, the control proceeds to step S6 when the chip sweeping robot 20 is determined to be not going to drop off even though the chip sweeping robot 20 keeps moving straight.

Then, in step S5, the travel and the traveling directions of the crawlers 31 are controlled whereby the chip sweeping robot 20 is prevented from dropping off the upper surface 13*a* of the table 13.

Subsequently, in step S6, the chip sweeping robot 20 travels in accordance with the travel route, whereby the chips scattered on the upper surface 13*a* and in the T grooves 13*b* of the table 13 are swept off and discharged onto the chip conveyors 15.

Then, in step S7, it is determined whether or not the machining of the workpiece W by the machine tool 10 is completed. Here, when the machining by the machine tool 10 is determined to be completed, the chip sweeping robot 20 returns to a robot standby position and stops moving. On the other hand, when the machining by the machine tool 10 is determined to be not completed, the control returns to step S2 and continues the processing.

As described above, the chip sweeping robot 20 according to the present invention can possess adaptability to various machine tools by making the robot body 21 capable of autonomously traveling on the upper surface 13*a* of the table 13. Moreover, the rotating brush 43 and the blade 44 are sequentially provided in front of the autonomously travelable robot body 21 in the traveling direction from the front side to the back side in the traveling direction. Thus, the chip sweeping robot 20 can automatically sweep a wide range efficiently.

INDUSTRIAL APPLICABILITY

The present invention is applicable to a chip recovery system to recover chips generated in the course of machining an object to be machined, by discharging the chips out of a machine tool.

The invention claimed is:

1. A chip sweeping robot configured to sweep chips, which are scattered on an upper surface of a table of a machine tool at the time of machining an object to be machined being attached onto the upper surface of the table, by traveling in accordance with a travel route set on the upper surface of the table, the chip sweeping robot comprises:
    a robot body configured to autonomously travel on the upper surface of the table;
    a rotating brush provided in front of the robot body and configured to sweep the chips out forward in a traveling direction by being rotated from a lower side to an upper side forward in the traveling direction; and
    a blade provided behind the rotating brush and configured to scoop out the chips, which pass through the rotating brush, forward in the traveling direction and to send the chips to a rotating region of the rotating brush.

2. The chip sweeping robot according to claim 1, wherein the chip sweeping robot comprises a brush rotating motor provided behind the blade and configured to rotate the rotating brush, and
    the rotating brush is connected to the brush rotating motor on outside in a width direction of the blade in such a way as to bypass the blade.

3. The chip sweeping robot according to claim 1, wherein the chip sweeping robot comprises a magnet provided on a lower surface of the robot body and configured to exert an attracting force onto the upper surface of the table and to inhibit the robot body from being lifted off.

4. The chip sweeping robot according to claim 3, wherein the magnet is provided at a rear part of the robot body.

5. The chip sweeping robot according to claim 1, wherein the chip sweeping robot comprises a battery serving as a drive source for travel of the robot body, and
    the battery is provided at a rear part of the robot body.

6. The chip sweeping robot according to claim 1, wherein the chip sweeping robot comprises a protection cover covering the robot body, the rotating brush and the blade from above and both right and left sides.

7. The chip sweeping robot according to claim 6, wherein the protection cover comprises an upper cover unit forming an upper part of the protection cover, and
    an upper surface of the upper cover unit is an inclined surface.

8. The chip sweeping robot according to claim 7, wherein the upper cover unit is formed into a convex shape in such a way as to be inclined downward from a central part in a width direction toward two end portions in the width direction.

9. The chip sweeping robot according to claim 6, wherein the chip sweeping robot comprises crawlers rotatably supported on both right and left side portions of the robot body, and
    the protection cover covering the robot body is supported on side surfaces of the crawlers.

10. The chip sweeping robot according to claim 1, the chip sweeping robot further comprises:
    an anti-drop sensor configured to detect the upper surface of the table; and
    an anti-drop control unit configured to control travel of the robot body depending on a detection result of the anti-drop sensor and to prevent the robot body from dropping off the upper surface of the table of the robot body.

11. The chip sweeping robot according to claim 10, wherein the anti-drop sensor is provided in front of the robot body.

12. The chip sweeping robot according to claim 10, wherein the anti-drop sensor is provided behind the blade.

13. The chip sweeping robot according to claim 1, wherein the chip sweeping robot comprises:
    an obstacle detection sensor configured to detect an obstacle located in front of the robot body; and
    a collision avoidance control unit configured to control travel of the robot body depending on a detection result of the obstacle detection sensor and to avoid a collision of the robot body into the obstacle.

14. The chip sweeping robot according to claim 13, wherein the chip sweeping robot comprises a partition plate isolating the obstacle detection sensor from the rotating brush and the blade.

15. The chip sweeping robot according to claim 13, wherein the obstacle detection sensor is provided behind a front end portion of a protection cover covering the rotating brush.

16. The chip sweeping robot according to claim 13, wherein the obstacle detection sensor is provided in front of the rotating brush.

17. The chip sweeping robot according to claim 1, wherein the travel route of the robot body is set in accordance with a size of the upper surface of the table and with an attachment position and a size of the object to be machined.

18. The chip sweeping robot according to claim 1, wherein
   the robot body travels on the travel route when the machine tool is operated, and
   the robot body stops on the travel route when the operation of the machine tool is stopped.

19. The chip sweeping robot according to claim 1, wherein lengths of bristles of the rotating brush, hardness of the bristles, and a density of the bristles are set in accordance with a shape of a T groove formed in the upper surface of the table.

20. The chip sweeping robot according to claim 1, wherein the blade is curved forward in the traveling direction from an upper end portion to a lower end portion of the blade.

21. The chip sweeping robot according to claim 1, wherein a material of the rotating brush is a heat-resistant resin.

22. The chip sweeping robot according to claim 1, wherein a material of the blade is a heat-resistant resin.

* * * * *